United States Patent [19]

Reiber

[11] 4,124,311

[45] Nov. 7, 1978

[54] MECHANICAL MOVEMENTS FOR CODING MACHINES

[75] Inventor: Albert H. Reiber, Evanston, Ill.

[73] Assignee: The United States of America as represented by the Secretary of the Navy, Washington, D.C.

[21] Appl. No.: 317,455

[22] Filed: Feb. 5, 1940

[51] Int. Cl.² .............................................. B41J 7/66
[52] U.S. Cl. .......................................... 400/90; 35/4; 178/81
[58] Field of Search ...................... 197/4; 35/4; 178/81

[56] References Cited

U.S. PATENT DOCUMENTS

| 1,861,857 | 6/1932 | Hebern | 197/4 |
| 2,116,683 | 5/1938 | Lemmon et al. | 197/4 |
| 2,116,732 | 5/1938 | Noll | 197/4 |
| 2,116,733 | 5/1938 | Noll | 197/4 |

*Primary Examiner*—Samuel Feinberg
*Attorney, Agent, or Firm*—John R. Utermohle

EXEMPLARY CLAIM

1. A ciphering unit mechanism, comprising a rotatable cam sleeve provided with a plurality of cams, a clutch engageable to effect driving of said sleeve, a plurality of character keys, a swingable bail operable by all of said keys connected to release said clutch to engage with said sleeve, a plurality of coaxial drums mounted for independent step-by-step rotation, each said drum having on each face a number of contacts equal to the number of said keys with the contacts on one face randomly connected to those on the other face, a fixed member between each two drums having means to connect each said contact on the adjacent face of the drum on one side of the fixed member to a contact on the adjacent face of the drum on the other side, each said drum having a circumferential series of teeth equal in number to said contacts, an individual circuit closable by each said key connected to some one of said random circuits; an operating mechanism for each of said drums, including a rotatable wheel having a circumferential series of teeth and a series of longitudinally slidable pins disposed parallel to the axis of said wheel and equal in number to the teeth thereon, two pawls respectively engaging the teeth on said drum and said wheel, a longitudinally reciprocable push bar operatively connected to both said pawls, the forward portion of said bar being pivoted on the after portion thereof for vertical movement and having a forwardly facing shoulder and a rearwardly extending finger, a conditioning lever pivoted intermediate its ends having at its lower end a stud positioned to contact said finger and raise the said forward portion when said lever is latched and permit said portion to drop when said lever is unlatched, said lever having a rearwardly facing latching shoulder intermediate the pivot and the upper end of said lever, a pivoted latch having a forwardly extending arm to engage said latching shoulder to hold said lever in latched position and a rearwardly extending arm, a roller arm pivoted at one end, a roller carried by said arm to contact said pins, a translating lever pivoted at one end to the free end of said arm and slidably supported at its other end and having a latching projection on its upper side, a latching pin on said conditioning lever engageable by said projection to latch said lever, means to retract said translating lever and hold said roller in the path of such of said pins as are in one position, a bail actuatable by a cam on said sleeve to swing said translating lever up when said roller is riding over a said pin, means actuated by said translating lever to release a said latch and free the lever, controlled thereby to raise the forward portion of a push bar associated with such lever, and an operating bail actuated by a cam on said sleeve to engage the shoulders on all push bars thus raised and thereby to rotate one tooth each the drum and wheel associated with each said push bar raised as aforesaid.

18 Claims, 9 Drawing Figures

INVENTOR.
ALBERT H. REIBER

BY

ATTORNEY.

MECHANICAL MOVEMENTS FOR CODING MACHINES

The invention relates to machines for coding and decoding messages and recording the same, and particularly to mechanical movements for effecting certain functions involved in the operational cycle of such devices.

Among the objects of this invention are:

to provide, in coding mechanism having variable random electric circuits, means to insure invariably at least two changes in such circuits each cycle of operation;

to provide means for making continuous successive changes in such circuits to effect a desired positional relation of the elements carrying such circuits;

to provide, in the coding portion of the mechanism, means to cause periodic automatic spacing of the recorded characters; and to provide means for automatically stopping, at a respective predetermined angular position, each of several rotatable power driven members.

The inventive subject matter in this application is designed for use in devices of the type invented by Larson, Levin and Thienemann and disclosed in their application Ser. No. 317,454, filed Feb. 5, 1940. The mechanical movements herein set forth were developed to execute in a most effective manner certain mechanical and electrical functions involved in the enciphering and deciphering of messages.

Figure 1:
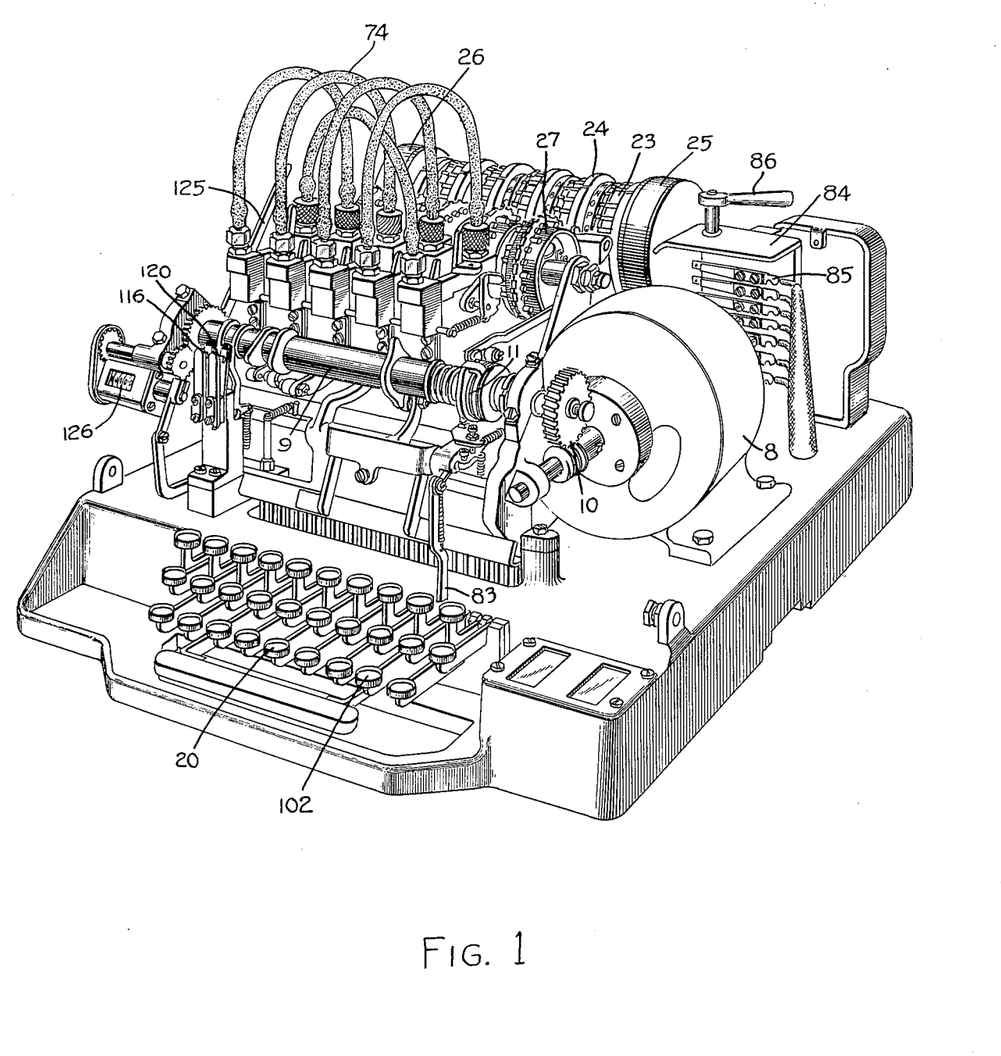
FIG. 1 is a perspective view of a coding machine in which are used the novel mechanical units described and claimed herein.
Figure 2:
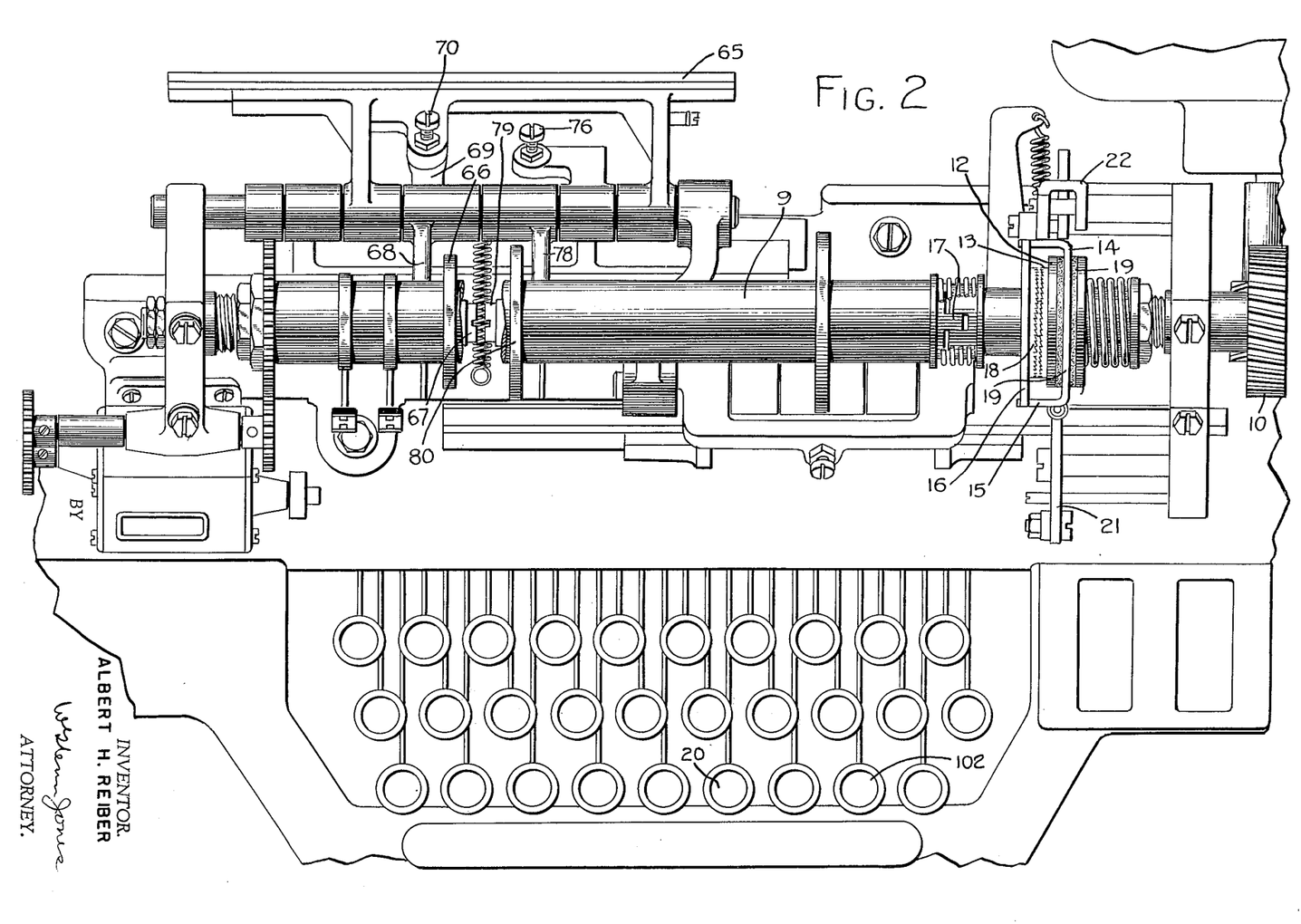
FIG. 2 is a detail plan view showing the mechanical operating elements of the machine.

A perspective view of the coding unit appears in FIG. 1. The motor 8 drives a cam sleeve 9 through worm gearing 10 and clutch 11. The details of the construction and operation of clutch mechanism 11 are fully set forth in the U.S. Patent to Albert H. Reiber, No. 2,019,505, issued Nov. 5, 1935. Sufficient details for present purposes are shown in FIG. 2 of the present drawings wherein the worm gearing 10 is connected to a flange 12 with which the clutch teeth 13 are integral. The disk 14 has laterally turned arms 15 engaged in notches in a camming disk 16 that is connected through the tenon and groove connection 17 to the cam sleeve 9. When teeth 13 are disengaged from teeth 18 integral with disk 16 and disk 14 is held against rotation, the friction washers 19 slip over the disk 14 but when the disk 16 is unlocked for rotation there is sufficient friction between washers 19 and the flange 12 and disk 14 to drive sleeve 9 until the disk 16 is released to engage teeth 18 with teeth 13, which occurs before the beginning of operation of any mechanism by sleeve 9. It is sufficient for the purposes of the present application to state that when any one of the keys 20 is depressed the lever 21 is actuated to disengage clutch locking lever 22 and permit the cam sleeve 9 to be driven.

As is common in machines of this type, a plurality of coding drums 23 are mounted for individual rotation on a common shaft and carry circuits randomly connected by the contacts on the opposite faces of the drums, which circuits are equal in number to the alphabet of characters to be used in messages. Between each two of the drums 23 is a spacer 24 having contacts equal in number, angular spacing, and radial distance, to the similar quantities relating to the contacts in the drums 23 so that the conductors through the spacers 24 cooperate with the contacts and circuit elements in the drums 23 to form circuits extending through all of the drums 23 and spacers 24 and connecting to conductive members in right hand member 25 and left hand member 26, all as is well known in this art.

Individual to and cooperating with each drum 23 is a wheel 27 having a peripheral rib 28 in which are disposed a plurality of pins 29 that are slidable parallel to the axis of the wheel and are held in the position to which they are adjusted by an annular coiled spring 30, each wheel and associated drum, together with the operating utilities therefor, constituting a functional train.

Figures 4, 8:
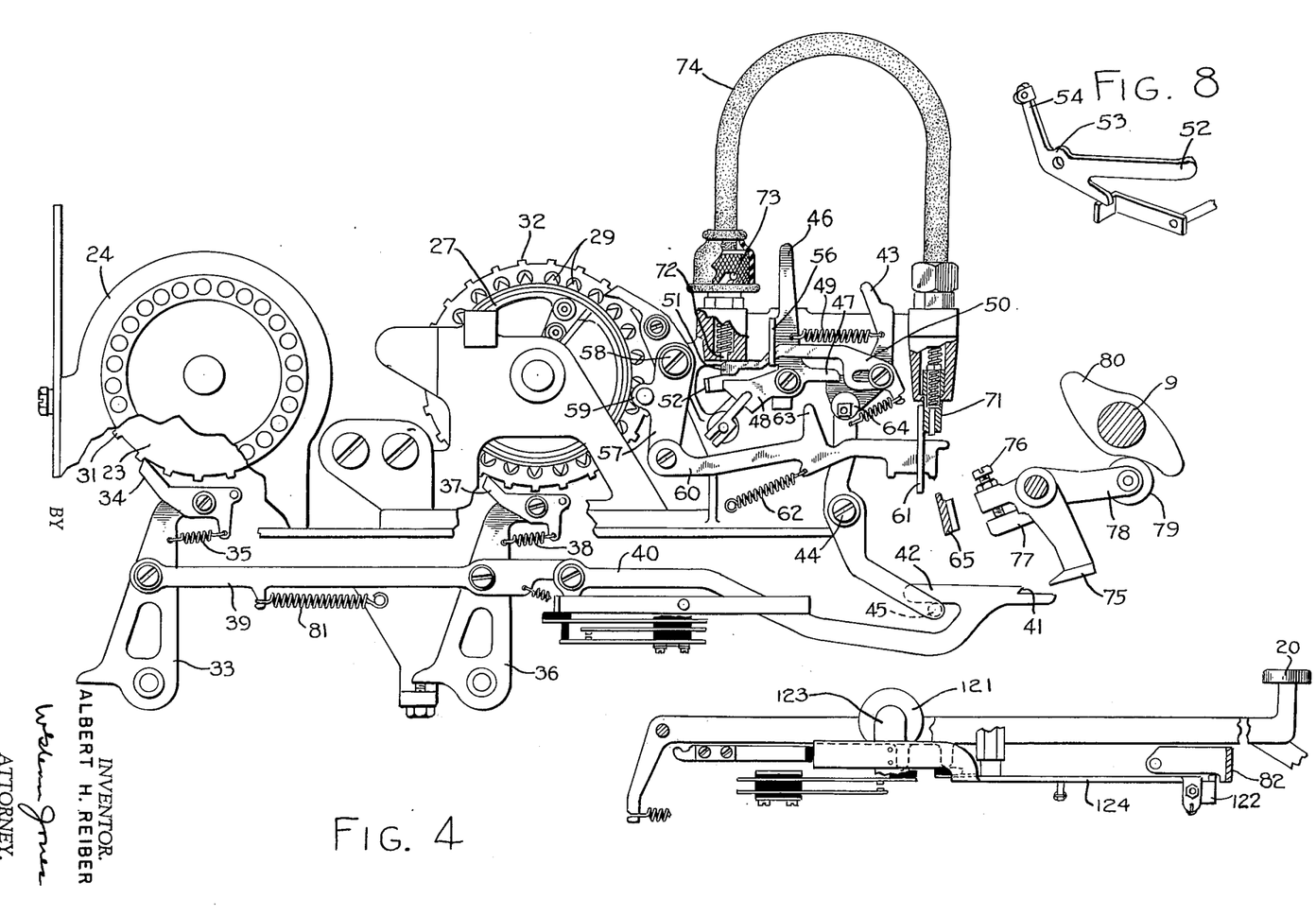
FIG. 4 is a side elevational view depicting certain elements involved in the operation of the parts disclosed in FIG. 3.
FIG. 8 is a detail perspective view of a transfer lever.

Referring now to FIG. 4, it will be seen that each drum 23 and each wheel 27 has a peripheral series of teeth 31 and 32, respectively. Adjacent each drum 23 is a pawl lever 33 pivotally mounted at its lower end and carrying at its free end a pawl 34 held in engagement with teeth 31 by a spring 35. Likewise, adjacent each wheel 27 is a similar pivoted pawl lever 36 carrying pawl 37 held in engagement with teeth 32 by spring 38. Pivotally connected to both pawl levers 33 and 36 is a link 39 which is also pivoted to a push bar 40 having at its forward end a shoulder 41 and a rearwardly extending finger 42. Conditioning lever 43 is pivoted at 44 and has secured in its lower end a stud 45 lying under the finger 42.

Figures 5, 9:
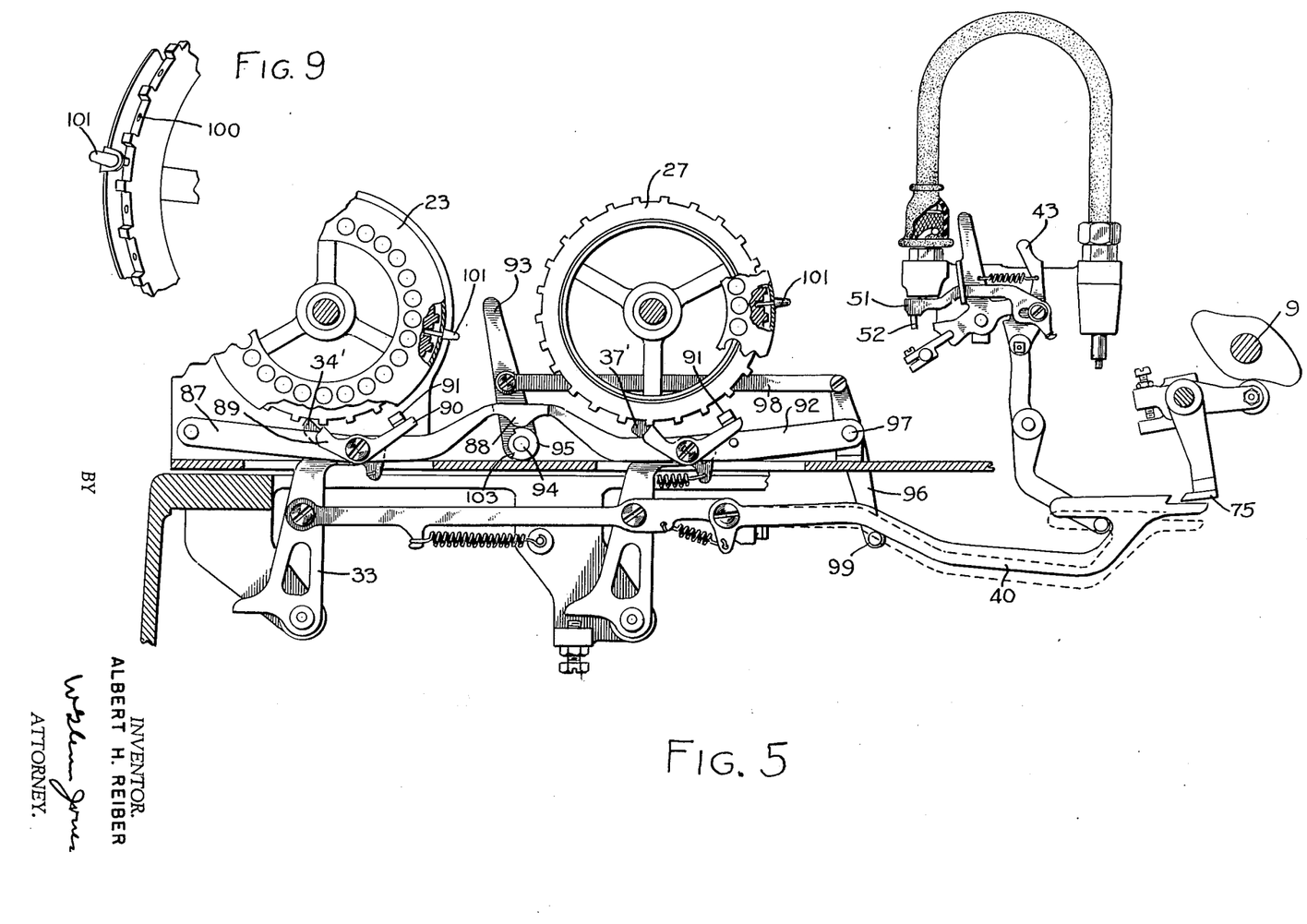
FIG. 5 illustrates mechanism for mechanically setting the drums in FIG. 3 to a predetermined initial position.
FIG. 9 is a detail elevational view of the structure for stopping each wheel and drum in a desired initial position.

Adjacent conditioning lever 43 is pivoted the latch 46 having a forwardly extending arm 47 engageable with a latch shoulder on conditioning lever 43 and a rearwardly extending arm 48, latch 46 and conditioning lever 43 being connected together by a contractile spring 49. Pivotally mounted on conditioning lever 43 is transfer slide 50 having a free end 51 disposed above arm 48 of latch 46 when in the latched position shown in FIG. 4 and being disposed above the portion 52 of transfer lever 53 (FIG. 3) when the parts are in the unlatched position shown in FIG. 5. Transfer lever 53 is pivotally mounted and has a portion 54 carrying an adjustable screw 55 to contact laterally turned portion 56 of latch 46 in the next adjacent functional train, the transfer slide 50 of each train passing through a slot in laterally turned portion 56 in that train.

Figure 3:
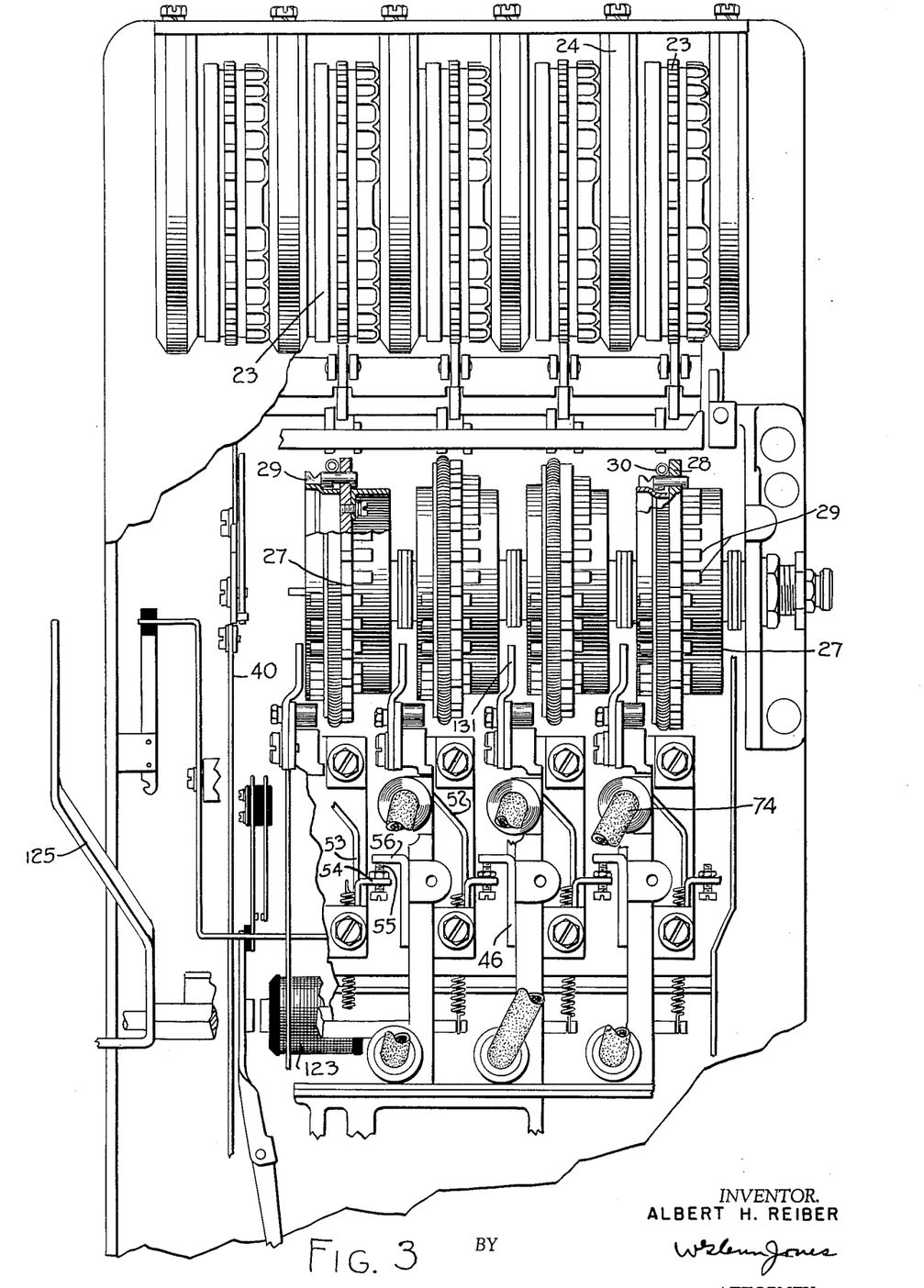
FIG. 3 is a top plan view of the units for changing the random electric circuits.
Figure 6:
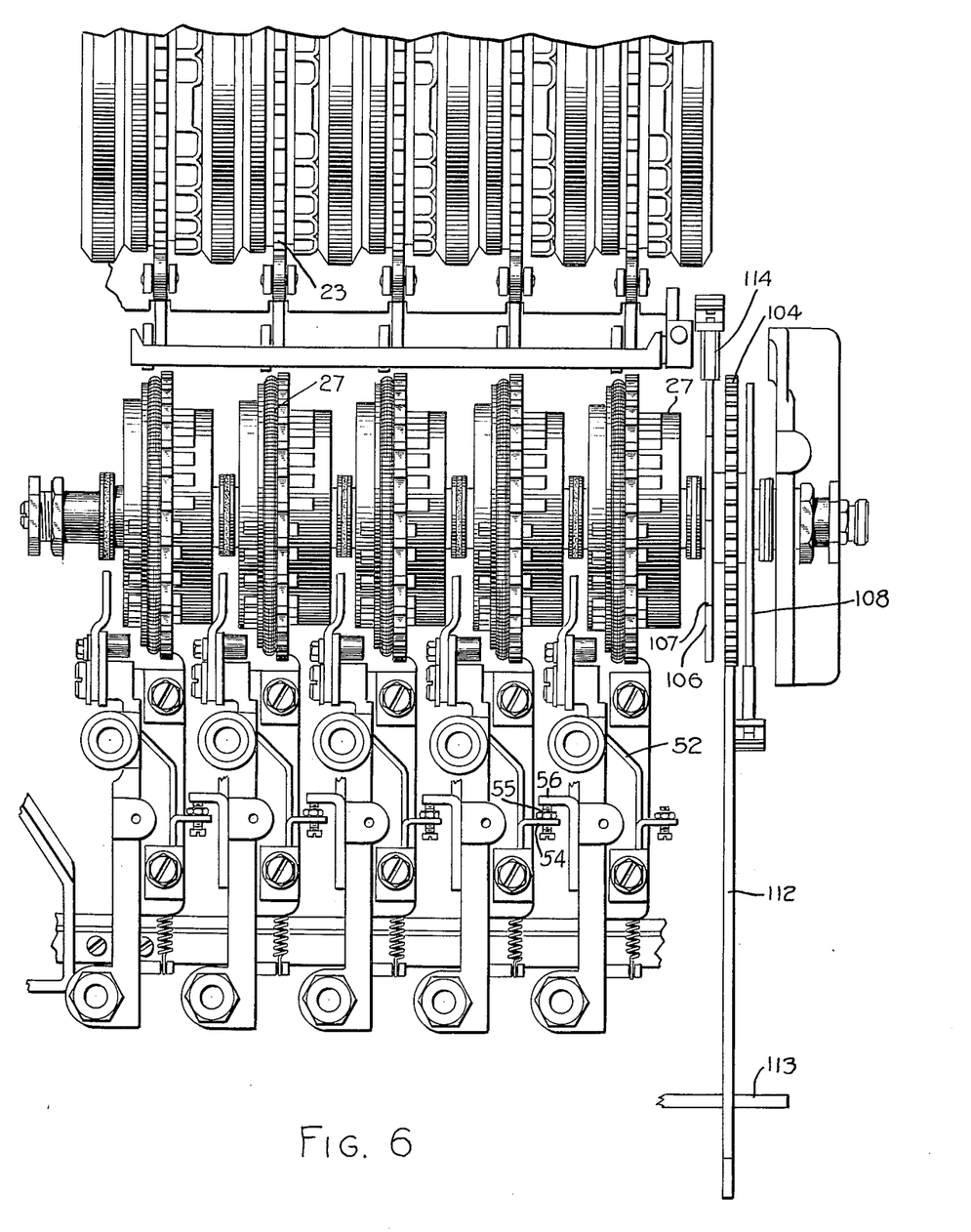
FIGS. 6 and 7 are respectively a top plan view and a detailed elevational view of means for putting in an added space after each group of a predetermined number of characters in the coded message.

Roller arm 57 is pivoted at one end at 58 and carries a roller 59 to contact such of the pins 29 as are adjusted to their farthest left hand position as seen in FIG. 1 or their uppermost position in FIGS. 3 and 6. Pivoted to the lower end of roller arm 57 is a translating lever 60 having its forward end slidably mounted in a slot in hanger 61 and connected to a retractile spring 62 that holds roller 59 rearwardly and also moves lever 60 back to inoperative position. When roller 59 rides over a pin 29, the lever 60 is moved fowardly so that projection 63 engages stud 64 on conditioning lever 43 to move that lever to the latched position and simultaneously the forward portion of the lever 60 is moved to be engageable with the bail 65 that is swung upwardly by cam 66 on cam sleeve 9 through contact with cam roller 67 carried by an arm 68 operatively connected to bail 65 through a portion 69 that engages contact screw 70.

Disposed above the forward end of each lever 60 is a slidable plunger 71 that is pushed upwardly by the lever 60 and through the mechanism of the well-known Bowden wire pushes downwardly on a plunger 72 disposed to contact free end 51 of transfer slide 50. As is clearly shown in FIG. 4, the rearward end of each Bowden wire is connected by a pin and bayonet slot 73 and hence is readily detachable to interchange the connections of the rear ends of the Bowden wires 74 among the several trains. Push bar bail 75 is connected, through adjusting screw 76, arm 77 integral with arm 78, and roller 79, to be actuated by cam 80 on sleeve 9. When conditioning lever 43 is in the unlatched position the stud 45 is moved counter clockwise against finger 42 and lifts push bar 40 so that shoulder 41 lies in the path of bail 75 and the clockwise movement imparted to bail 75 by cam 80 moves push bar 40 rearwardly and rotates the drum 23 and wheel 27 through the angular distance between two adjacent teeth, the pawls 34 and 37 clicking back over the teeth when spring 81 again moves link 39 forward.

When conditioning lever 43 is latched the stud 45 is moved clockwise and permits push bar 40 to drop down out of the path of bail 75 so that no rotation is imparted to the drum and wheel in a train wherein the push bar is in its non-operating position and hence so far as that particular drum 23 is concerned, there will be no change in the random circuits. The mechanism above described provides for the unfailing operation of at least two drums, provided at least two of the conditioning levers 43 are initially tripped and in unlatched position, as will appear from the description of the operation now to be given.

When a character key 20 is depressed, the universal bail 82 is rotated and through its connection to lever 21 through link 83 releases clutch mechanism 11 to drive sleeve 9 one-half rotation, which, since all the cams carried by sleeve 9 are double, effects a complete cycle of operation of the mechanism. Assuming the push bar 40 to be raised into the path of bail 75, the drum 23 and wheel 27 will each be rotated one tooth. Further assuming that roller 59 rides over a pin 29 during this movement of the wheel 27, the lever 60 will be moved forwardly to be engaged by bail 65 and raised upwardly to impart movement to plunger 71 and thereby to plunger 72 through the connecting Bowden wire.

Downward movement of plunger 72 will move free end 51 of transfer slide 50 downwardly and, if the conditioning lever 43 of the train to which the other end of Bowden wire 74 is connected is latched, the plunger 72 will move end 51 of transfer slide 50 down against arm 48 of latch 46 and disengage the latch from conditioning lever 43, thus permitting the stud 45 to be swung upwardly and raise the cooperating push bar 40 into the path of bail 75. On the other hand, in the event the conditioning lever 43 of the train to which movement is translated by Bowden wire 74 be already unlatched, the end 51 of transfer slide 50 will overlie the portion 52 of the transfer lever 53 which will be rotated on its pivot to bring the screw 55 into contact with laterally turned portion 56 of the latch 46 in the next train and will thereby unlatch the conditioning lever 43 in the said next train and so will cause the said next train to be operated at the next cycle of cam sleeve 9. Thereby I eliminate the possibility that operation of the translating lever 60 will not result in the conditioning of another train for operation. It is apparent that this must be so since each time the lever 60 is moved forward it latches conditioning lever 43 associated therewith through contact of projection 63 with stud 64 and it could, in the absence of translating means as above described, come about that no train would be conditioned for operation and hence no changes take place in the random circuits.

A switch 84 has a set of contact pile-ups 85 connected through the end members 25 and 26 with each random circuit through the drums 23 and spacers 24, which pile-ups are, by manipulation of handle 86, closed to send the current through the drums 23 from left to right when coding and from right to left when decoding. It is obvious that for a successful decipherment of a message, the circuit connections through the drums 23 must be identically the same, character for character as in coding and hence it is necessary that the pins 29 in each of the wheels 27 be set with the same respective identical arrangement as on the machine that coded the message and that the drums 23 and wheels 27 must be set to the same initial angular positions. The mechanism now to be described provides for the mechanical setting of the drums 23 and wheels 27 to such initial positions.

Adjacent each drum 23 is a lever 87 pivoted at its rear end and having its free end bearing a cam 88 disposed between the drum 23 and the wheel 27 cooperating therewith. On this lever is pivoted a bell crank pawl having a rear arm 89 and a forward arm 90. The pawl 34' carried on pawl lever 33 has a laterally turned portion 91 that lies above the arm 90 to be contactible thereby. A lever 92 similar to lever 87 is pivoted at its forward end, extends under a wheel 27, has a camming projection similar to 88 on its free end adjacent the cam 88 and carries a bell crank pawl with arms 89 and 90 as above. Lever 93 is pivoted at 94 and fixed to a cam 95 to rotate therewith. Lever 96 is pivoted at 97, is connected to lever 93 by link 98 and carries at its lower end a stud 99 that underlies all the push bars 40.

Each drum 23 and wheel 27 has a radially extending hole 100 between each two teeth into which a pin 101 may be inserted at such position that when the respective drum or wheel is stopped, as hereinafter described, each wheel and drum will be at the desired initial position. When lever 93 is in the position shown in FIG. 5 the studs 99 hold all the push bars 40 up into the path of push bar bail 75 so that all the push bars are operated, and hence all the drums 23 and wheels 27 are rotated, each cycle of operation of sleeve 9. A repeat key 102 is provided to unlock clutch 11 without operating any of the character keys 20 and when the repeat key is held down the sleeve 9 continues to rotate and causes actuation of the push bars 40 twice in each complete revolution thereof. Under these conditions, the drums 23 and wheels 27 are rotated continuously until the pin 101 carried by each contacts the arm 89 of the respective bell crank pawl which lifts the arm 90 thereof upwardly against overturned portion 91 of the operating pawl 34' or 37' and locks such operating pawl out of operative relation with the teeth 31 or 32, as the case may be.

It is evident that when this occurs the respective drum 23 or wheel 27 will cease rotating even though the cooperating push bar 40 continues to be actuated. After the drums 23 and wheels 27 have been set to the desired initial positions, lever 93 is rotated clockwise which brings cutout portion 103 of cam 95 under cam 88, permitting the free ends of levers 87 and 92 to drop down and move the bell crank pawls carried thereby out of operative relation with respect to the pawls 34' and 37'. It will be seen from the foregoing that the lever 93 takes control of the positioning of the push bars 40 and the latter are held in position to be actuated by bail 75 regardless of the latching or unlatching of the conditioning levers 43.

Figure 7:
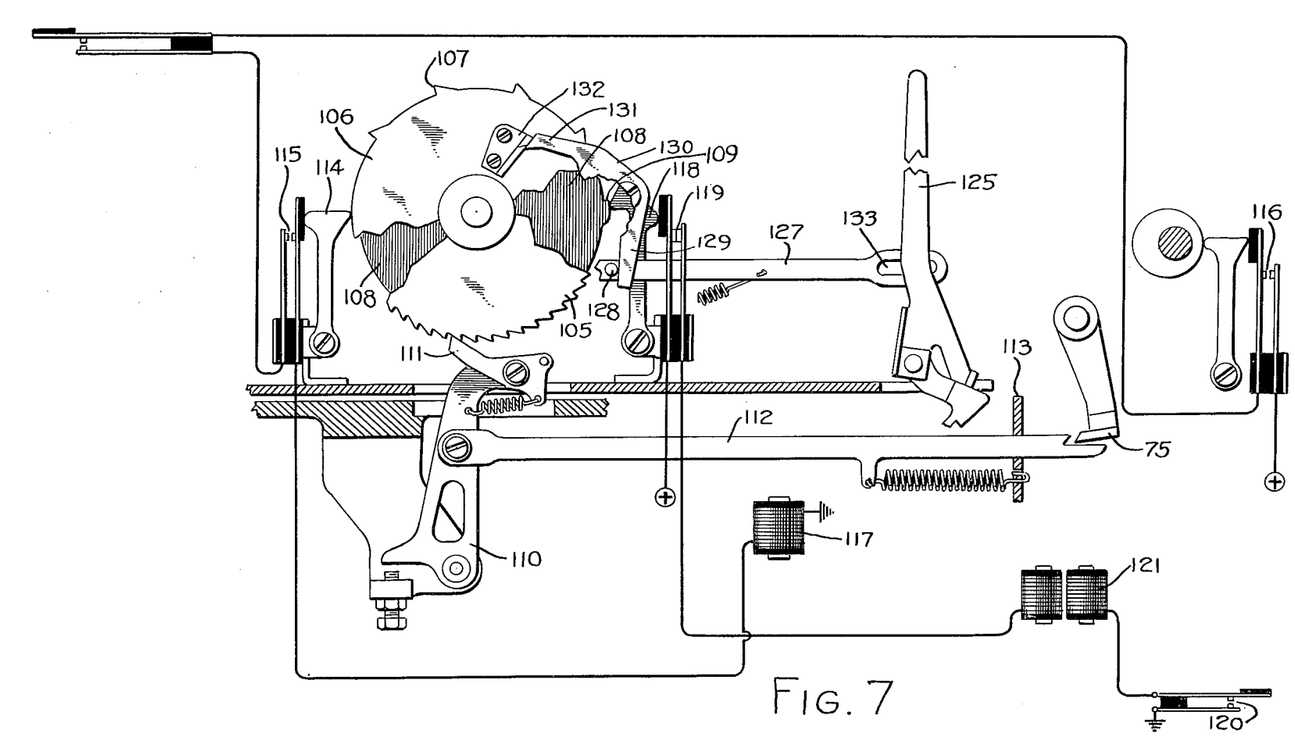

It is desirable that the characters in the coded message be broken up into groups, five characters per group being the number at present preferred. To effect this, it is necessary that an extra space be added after each fifth character and the mechanism now to be described is provided in the coding machine to insert such extra space. As will be seen in FIGS. 6 and 7, I provide a disk 104 mounted coaxially with the wheels 27 and having on its periphery a series of teeth 105 equal in number to the number of characters to be printed in each line of a coded message, in the present instance there being fifty of such teeth. Fixed to disk 104 to rotate therewith is a second disk 106 having on its periphery a tooth 107 corresponding to the positions of each of the fourth, ninth, fourteenth, etc., teeth 105, beginning at an initial tooth that is determined as hereinabove set forth. Still another disk 108 is fixed to disk 104 to rotate therewith and has on its periphery a single tooth 109 positioned to correspond with the forty-ninth tooth on disk 104.

A pawl lever 110 carries a pawl 111 that engages the teeth 105 and is pivotally connected to a push bar 112 that is slidable in a hanger 113 to be held continuously in condition to be actuated by push bar bail 75 so that disk 104 is rotated one tooth each cycle of operation of bail 75.

A pivoted contact cam 114 is disposed to ride on the periphery of disk 106 and closes contacts 115 each time it rides over a tooth 107, thus closing, in cooperation with contacts 116 (FIG. 1), the circuit to added space magnet 117, which actuates the mechanism to insert an extra space as fully described in the said application of Larson, Levin and Thienemann.

Also, when tooth 109 rides under contact lever 118 the contacts 119 are closed and in cooperation with contacts 120 (see also FIG. 1) closes the circuit to keyboard lock magnets 121 to lock the keyboard against further operation by moving locking blade 122 (FIG. 4) into position to prevent depression of universal bail 82 by a key 20. When magnet 121 is energized, armature 123 is attracted and thereby rotates the lever 124 to which plate 122 is connected. This mechanism is likewise fully described in the aforesaid application of Larson, Levin and Thienemann.

When a message is to be coded, the reset lever 125 is pulled forwardly and, among other things, sets to zero the counter 126 driven from sleeve 9. Connected to reset lever 126 is a link 127 having at its other end a stud 128 that engages lower arm 129 of bell crank detent 130 when lever 125 is moved forwardly. This engagement of stud 128 with arm 129 moves arm 131 of lever 130 into the path of stop 132 on disk 106, which stop is so positioned that when it engages arm 131 the teeth on the several disks 104, 106, and 108 are correctly positioned to perform their function at the correct time in the operation of the device. Link 127 has a slotted connection, as shown at 133 with lever 125 to permit sufficient movement of lever 125 to effect resetting of counter 126 at the same time as detent 130 is moved into the path of stop 132. The disks 104, etc., may be manually rotated to bring the stop 132 into position against arm 131.

While the transfer of operation is herein described and claimed as being effected by Bowden wires, it will be understood that the substitute for such wires disclosed in the copending application of Berthel F. Madsen, Ser. No. 317,458, filed Feb. 5, 1940, may be used instead, and is considered to be an equivalent of the Bowden wires for the purposes of the present disclosure.

I claim:

1. A ciphering unit mechanism, comprising a rotatable cam sleeve provided with a plurality of cams, a clutch engageable to effect driving of said sleeve, a plurality of character keys, a swingable bail operable by all of said keys connected to release said clutch to engage with said sleeve, a plurality of coaxial drums mounted for independent step-by-step rotation, each said drum having on each face a number of contacts equal to the number of said keys with the contacts on one face randomly connected to those on the other face, a fixed member between each two drums having means to connect each said contact on the adjacent face of the drum on one side of the fixed member to a contact on the adjacent face of the drum on the other side, each said drum having a circumferential series of teeth equal in number to said contacts, an individual circuit closable by each said key connected to some one of said random circuits; an operating mechanism for each of said drums, including a rotatable wheel having a circumferential series of teeth and a series of longitudinally slidable pins disposed parallel to the axis of said wheel and equal in number to the teeth thereon, two pawls respectively engaging the teeth on said drum and said wheel, a longitudinally reciprocable push bar operatively connected to both said pawls, the forward portion of said bar being pivoted on the after portion thereof for vertical movement and having a forwardly facing shoulder and a rearwardly extending finger, a conditioning lever pivoted intermediate its ends having at its lower end a stud positioned to contact said finger and raise the said forward portion when said lever is latched and permit said portion to drop when said lever is unlatched, said lever having a rearwardly facing latching shoulder intermediate the pivot and the upper end of said lever, a pivoted latch having a forwardly extending arm to engage to said latching shoulder to hold said lever in latched position and a rearwardly extending arm, a roller arm pivoted at one end, a roller carried by said arm to contact said pins, a translating lever pivoted at one end to the free end of said arm and slidably supported at its other end and having a latching projection on its upper side, a latching pin on said conditioning lever engageable by said projection to latch said lever, means to retract said translating lever and hold said roller in the path of such of said pins as are in one position, bail actuatable by a cam on said sleeve to swing said translating lever up when said roller is riding over a said pin, means actuated by said translating lever to release a said latch and free the lever controlled thereby to raise the forward portion of a push bar associated with such lever, and an operating bail actuated by a cam on said sleeve to engage the shoulders on all push bars thus raised and thereby to rotate one tooth each the drum and wheel associated with each said push bar raised as aforesaid.

2. A ciphering unit, comprising a plurality of coaxial drums mounted for independent step-by-step rotation, each said drum having a plurality of contacts on each face and conductors randomly connecting in pairs the contacts on the opposite faces, means cooperating with said drums to establish continuous circuits through all said drums, each said drum having an annular series of teeth equal in number to said pairs of contacts; a mechanism for sporadically rotating each said drum one step, each said mechanism including a rotatable wheel having an annular series of teeth and an annular series of pins slidable parallel to the axis of said wheel and equal in number to the teeth thereon, two pawls respectively engaging the teeth on said drum and said wheel, a reciprocable push bar operatively connected to both said pawls, the forward portion of each said bar being pivoted on the after portion thereof for vertical movement and having a forwardly facing shoulder and a rearwardly extending finger, a conditioning lever pivoted intermediate its ends having at its lower end a stud positioned to contact said finger to raise the said forward portion when said lever is unlatched and to permit said portion to drop when said lever is latched, said lever having a rearwardly facing latching shoulder intermediate the pivot and the upper end of said lever, a pivoted latch having a forwardly extending arm to engage said latching shoulder to hold said lever latched and a rearwardly extending arm and a laterally turned portion, a roller arm pivoted at one end, a roller carried by said arm lying in the path of such of said pins as are in one position, a translating lever pivoted at one end to the free end of said arm and slidably supported at its other end and having a latching projection on its upper side, a latching pin on said conditioning lever engageable by said projection to move said conditioning lever to latching position, means to retract said translating lever and hold said roller in the path of said pins, means to swing said translating lever up when the translating lever is slid forwardly by said roller riding over a said pin, a Bowden wire actuated by said translating when swung up, a transfer slide pivoted at its forward end on each said conditioning lever and having its rear end disposed to be rotated down by said Bowden wire, a pivoted transfer lever having a first portion disposed to be moved down by the rear end of said transfer slide when said conditioning lever is latched and a second portion to contact the laterally turned portion of the latch in a next adjacent mechanism when the first portion is so moved down, thereby to unlatch the conditioning lever in the said adjacent mechanism to condition said adjacent mechanism for operation, said slide contacting the rearwardly extending arm of the latch in the same mechanism when said slide is moved down while said latch is engaged with the associated conditioning lever thereby to condition the said same mechanism for operation.

3. A ciphering unit mechanism, comprising a plurality of keys, means including a plurality of coaxial rotatable drums establishing variable random electric circuits, each said circuit including contact elements closable by depression of a respective key; individual mechanism to rotate each drum step-by-step including a reciprocable device having operating and non-operating conditions, a pivoted conditioning lever having latched and unlatched positions and operative in the former position to condition said device for non-operation and in the latter position to condition said device for operation, a pivoted latch engageable with said lever to hold the latter in its latched position having a rear arm and a laterally turned portion, a pivoted transfer lever having a first portion engageable with the laterally turned portion of the latch in a next adjacent mechanism and a second portion, a transfer slide pivoted at one end on said conditioning lever and having its other end free, said free end being positioned to contact the rear arm of the latch in the same mechanism when said latch is engaged and to contact the second portion of said transfer lever when said latch is disengaged, motion transmitting means energized by said individual mechanism operative to move down the free end of the said slide in another said mechanism whereby to disengage the latch in said other mechanism if engaged or to actuate the transfer lever in said other mechanism and disengage the latch in the mechanism next adjacent to said other mechanism if the latch in said other mechanism is already disengaged, and sporadically acting means to actuate said motion transmitting means and simultaneously to latch said conditioning lever.

4. A ciphering unit mechanism, comprising a plurality of keys, elements rotatable step-by-step to establish variable random electric circuits equal in number to said keys and to the number of steps in a complete rotation of a said element, a pair of circuit closing contacts individual to each said key and connected to some one of said circuits; individual mechanism to effect step rotation of each said element including reciprocable means to rotate the respective element one step each reciprocation having a part movable to operating and to non-operating position, conditioning means to determine the position of said part, means acting sporadically to operate said conditioning means, elements coacting with each said individual mechanism when such individual mechanism functions to condition another said individual mechanism for operation, and driving means connected to actuate once all of said individual mechanisms that are conditioned for operation each time any one of said keys is operated.

5. A ciphering unit mechanism, comprising a plurality of character keys, movable members each carrying a number of circuit elements equal to the number of said keys, means coacting therewith to connect each said element in each member into a circuit with an element in each other said member, a pair of contact members individual to each said key to be closed by depression of such key, each said pair of contacts being connected in a respective said circuit, individual mechanism operatively connected to each said member to move such member to change said circuits, means actuated sporadically by the functioning of each said mechanism to condition some other mechanism for operation thereby to insure that at least one of said mechanism is always conditioned for operation and simultaneously to condition the then functioning mechanism for non-operation, and means operating in a discrete cycle each time any said key is depressed to actuate all said mechanisms that are conditioned for operation.

6. A ciphering device mechanism, comprising a plurality of operating trains each having as members an individually rotatable drum and an individually rotatable wheel, each said drum and wheel having an annular series of teeth, each said drum carrying a number of random circuit elements, means connecting each said element in each drum into a circuit with an element in each of the other drums, each said train member having an annular series of teeth and a hole between each two teeth, a pin individual to each said train member insertable in any said hole in the respective train member, a rockably mounted member adjacent said train member, a pawl pivoted on each said rockable member, each said pawl having one end engageable with the said teeth on the respective train member and a laterally turned portion at the other end, resilient means to urge said one end of each pawl into engagement with said teeth, a push bar connected to said rockable members, said push bar having a forward portion pivoted for vertical movement, a swingable bail engageable with said forward portions of all said push bars when raised, a pair of rock levers associated with each train, each said lever being pivoted at one end and the free ends of both levers lying adjacent each other between the drum and the wheel of the train, a rotatable cam disposed to raise said free ends of the levers in all said trains when rotated, a bell crank lever pivoted on each said rock lever, one arm of each said bell crank lever lying in the path of a respective said pin and the other end of each said bell crank lever lying under the said laterally turned portion of a respective pawl, whereby each pin will contact an arm of a bell crank lever and the other arm of each bell crank lever will move a pawl out of engagement with the teeth on a train member, and means to raise the forward portions of all said push bars and simultaneously to rotate said cam to raise the free ends of all said rock levers.

7. A ciphering device mechanism, comprising a plurality of operating trains each having as members an individually rotatable drum and an individually rotatable wheel, each said drum and wheel having an annular series of teeth, each said drum carrying a number of random circuit elements, means connecting each said element in each drum into a circuit with an element in each of the other drums, means to impart step-by-step rotation to said train members including a respective pivoted pawl engageable at one end with said teeth and having at the other end a laterally turned portion, means to impart oscillatory movement simultaneously to both pawls in a train including a portion adapted to be raised into operating position and to drop out of operating position, a bell crank lever pivoted adjacent each pawl with one arm of such lever disposed to be engageable with the laterally turned portion on the respective pawl to disengage said pawl from said teeth and the other arm of such lever positionable adjacent the periphery of the respective train member, a respective rock lever whereon each bell crank lever is mounted, a pin carried by each train member to be contactible with the said one arm of the respective bell crank lever and adjustable to effect such contact at a desired angular position of the train member, and means to move all said rocking levers to place said bell crank levers in operative relation with the respective pawls and pins in the train members and simultaneously to raise the said portions of all said oscillatory movement imparting means to operating position.

8. A ciphering device mechanism, comprising a plurality of operating trains each having as members an individually rotatable drum and an individually rotatable wheel, each said drum and wheel having an annular series of teeth, each said drum carrying a number of random circuit elements, means connecting each said element in each drum into a circuit with an element in each of the other drums, means to impart step-by-step rotation to said train members including a respective pivoted pawl engageable at one end with said teeth of each train member, means to impart oscillatory movement simultaneously to both pawls in a train including an instrumentality movable to condition said movement imparting means for operation or non-operation, sporadically acting means controlled by a said train member in each train to move a said instrumentality to change the condition of a said movement imparting means, means to render said pawls individually inoperative to rotate said train members at a selected angular position of train member rotated thereby notwithstanding continued operation of said movement imparting means, and means to move all said instrumentalities to condition all said movement imparting means for operation.

9. A ciphering device mechanism, comprising a plurality of operating trains each having as members an individually rotatable drum and an individually rotatable wheel, each said drum carrying a number of random circuit elements, means connecting each said element in a drum into a circuit with an element in each other drum, means to impart step-by-step rotation to each train member including oscillatory means individual to each train having a respective portion to engage each train member in the train and an instrumentality movable to operating or non-operating position, sporadically acting means controlled by a said train member in each train to move a said instrumentality to change the condition of a said movement imparting means and means to render said portions inoperative to engage the respective train member rotated thereby notwithstanding continued operation of said oscillatory means and to move said instrumentalities to the operating position.

10. A ciphering device mechanism, comprising a plurality of operating trains each having as members an individually rotatable drum and an individually rotatable wheel, each said drum carrying a number of random circuit elements, means connecting each said element in a drum into a circuit with an element in each other drum, means to impart step-by-step rotation to each train member including oscillatory means individual to each train having a respective portion to engage each train member in the train and an instrumentality movable to operating or non-operating position, and means to render said portions inoperative to engage the respective train member rotated thereby notwithstanding continued operation of said oscillatory means and to move said instrumentalities to the operating position.

11. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, locking means operable to prevent functioning of said mechanism, a first rotatably mounted disk having an annular series of fifty teeth on its periphery, oscillatible means actuated by said common driving means to rotate said disk one tooth each cycle, a second disk connected to rotate with said first disk and having a peripheral projection corresponding to the fourth tooth on said first disk from an initial point and a like projection corresponding to every fifth tooth of said first disk thereafter, a third disk likewise connected to rotate with said first disk and having a peripheral projection corresponding to the forty-ninth tooth on said first disk from said initial point, a pivoted member disposed to ride over said projections on said second disk, contacts disposed to be closed when said pivoted member rides over a projection as aforesaid to transmit an extra space pulse, a second pivoted member disposed to ride over the projection on said third disk, and contacts disposed to be closed by said second pivoted member when it rides over the projection on said third disk to operate said locking means.

12. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, a first rotatably mounted disk having an annular series of fifty teeth on its periphery, oscillatible means actuated by said common driving means to rotate said disk one tooth each cycle, a second disk connected to rotate with said first disk and having a peripheral projection corresponding to the fourth tooth on said first disk from an initial point and a like projection corresponding to every fifth tooth of said first disk thereafter, a pivoted member disposed to ride over the projections on said second disk, and contacts disposed to be closed by said pivoted member when said pivoted member rides over a said projection to transmit an extra space pulse.

13. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, locking means operable to prevent functioning of said mechanism, a first rotatably mounted disk having an annular series of fifty teeth on its periphery, oscillatible means actuated by said common driving means to rotate said disk one tooth each cycle, a second disk connected to rotate with said first disk and having a peripheral projection corresponding to the forty-ninth tooth on said first disk, a pivoted member disposed to ride over said projection, and contacts disposed to be closed by said pivoted member when said pivoted member rides over said projection to actuate said locking means.

14. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, locking means operable to prevent functioning of said mechanism, means actuated by said common driving means to transmit an extra space pulse after each fifth said cycle, and means likewise actuated by said common driving means to operate said locking means after the fiftieth said cycle.

15. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, locking means operable to prevent functioning of said mechanism, means actuatable by said common driving means to transmit an extra space pulse each fifth cycle of operation of said driving means, and means actuatable by said driving means simultaneously with said transmitting means operable to actuate said locking means after the fiftieth said pulse.

16. A ciphering unit mechanism, comprising a plurality of rotatable members bearing random circuit elements, means cooperating with said members to join a circuit element in each said member with a respective circuit element in all other of said members, individual means to impart sporadic step-by-step rotation to each said member, common driving means for all said individual means operating in discrete cycles, locking means operable to prevent functioning of said mechanism, means adjustable to render automatically said individual means ineffective as to each respective rotatable member when such member has reached a predetermined angular position, means actuated by said common driving means to transmit an extra space pulse after each fifth said cycle and means likewise actuated by said common driving means to operate said locking means after the fiftieth said cycle.

17. A ciphering unit mechanism comprising a plurality of functional mechanical trains each consisting of a rotatable drum and rotatable wheel, means for sporadically rotating each train independently of the others thereby making each train individually intermittently operable, latch means to condition each train for operation or non-operation, and manually adjustable means on each wheel also to condition for non-operation in a randomly variable manner the train of which said means is a part, said adjustable means operating the latch means to render one train inoperative and simultaneously initiate the conditioning of another said train for operation.

18. A ciphering unit mechanism comprising a plurality of functional mechanical trains consisting of rotatable elements, means for sporadically rotating each train independently of the others, a plurality of adjustable elements carried by one member of each train, said elements being adjustable to functioning or non-functioning position, latch means actuated by such elements as are in fuctional position to condition the respective train for non-operation, and means actuated by the aforesaid means to condition another train for operation.

* * * * *